(12) United States Patent
Cogan

(10) Patent No.: US 6,667,461 B1
(45) Date of Patent: Dec. 23, 2003

(54) MULTIPLE LOAD PROTECTION AND CONTROL DEVICE

(75) Inventor: Adrian I. Cogan, Redwood City, CA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/176,128

(22) Filed: Jun. 19, 2002

(51) Int. Cl.[7] .................................................. H05B 1/00
(52) U.S. Cl. ....................... 219/209; 219/210; 219/504; 361/106; 320/136
(58) Field of Search .................................. 219/209, 210, 219/504; 257/256; 361/106, 103, 93.8, 93.9, 93.1, 58, 100, 101, 10, 98, 27; 320/136, 134, 135, 137, 127

(56) References Cited

U.S. PATENT DOCUMENTS

| | | | |
|---|---|---|---|
| 4,553,020 A | * 11/1985 | Val | 219/209 |
| 5,321,283 A | * 6/1994 | Cogan et al. | 257/256 |
| 5,381,034 A | 1/1995 | Thrower et al. | 257/529 |
| 5,382,841 A | 1/1995 | Feldbaumer | 326/30 |
| 6,072,681 A | 6/2000 | Cogan et al. | 361/106 |
| 6,181,541 B1 | * 1/2001 | Souri et al. | 361/106 |
| 6,188,556 B1 | * 2/2001 | Souri et al. | 361/106 |
| 6,331,763 B1 | 12/2001 | Thomas et al. | 320/136 |
| 6,426,484 B1 | * 7/2002 | Hembree et al. | 219/209 |
| 6,518,731 B2 | * 2/2003 | Thomas et al. | 320/136 |

* cited by examiner

*Primary Examiner*—Sang Paik
*Assistant Examiner*—Fadi H. Dahbour

(57) ABSTRACT

An electrical device includes a package having an array of connections, a thermally conductive, electrically insulative substrate in the package, a plurality of polymeric positive temperature coefficient (PPTC) resistors in the package in thermal contact with the substrate, and, at least one heating element such as a power field effect transistor in thermal contact with the substrate, for indirectly heating the PPTC resistors in response to a control current, thereby to trip the PPTC resistors from a low resistance state to a very high resistance state. A method for controlling a plurality of electrical loads is also disclosed.

13 Claims, 5 Drawing Sheets

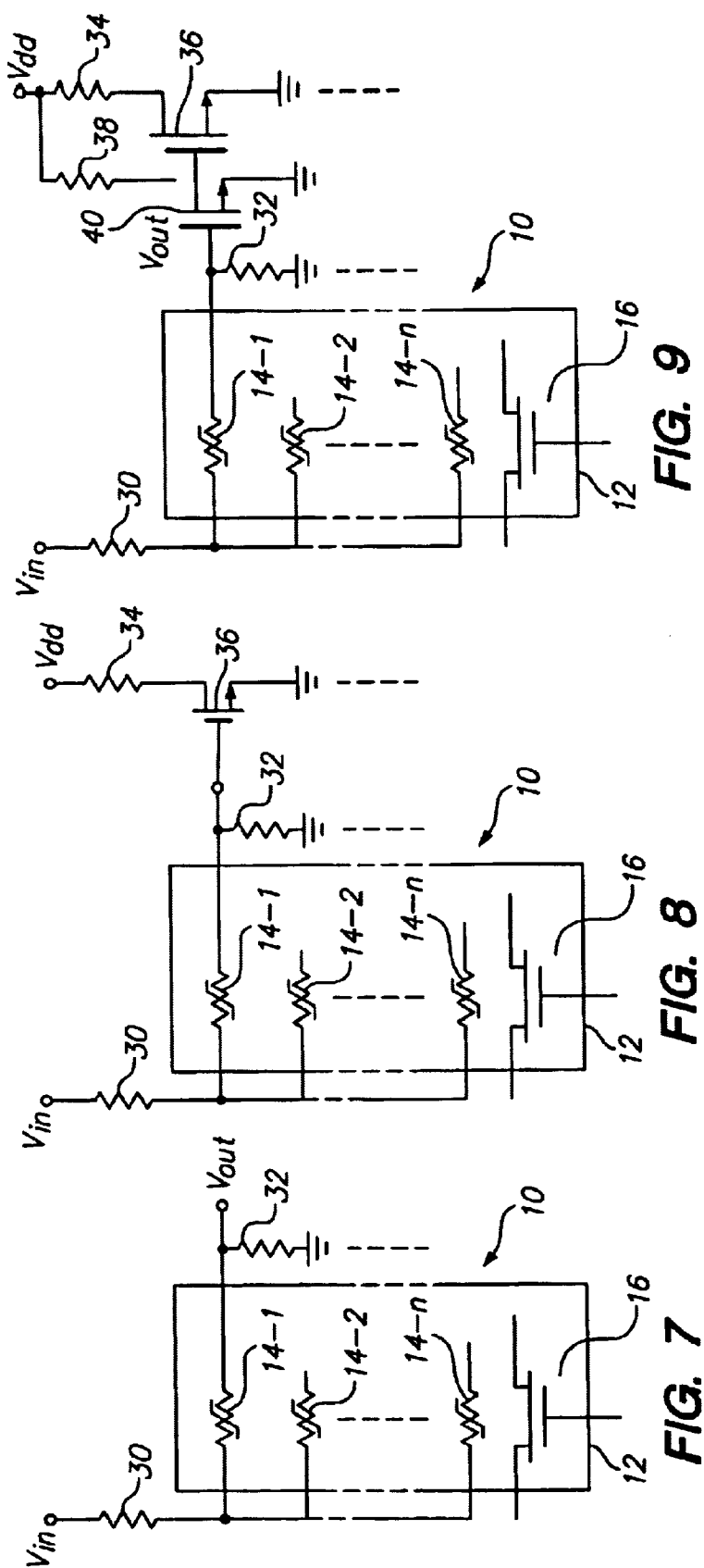

MULTIPLE LOAD PROTECTION AND CONTROL DEVICE

BACKGROUND OF THE INVENTION

1. Field of the Invention

The present invention relates to a power controlled electrical circuit protection device. More particularly, the present invention provides methods and apparatus for simultaneous control of several low or medium power loads while providing high voltage isolation to the power control element and overcurrent protection of the loads.

2. Introduction to the Invention

Many diverse applications exist for delivering low to moderate power simultaneously to a plurality of loads. The loads may be indicators, sensors or actuators such as small electric motors or solenoids for converting electrical energy into motive force. In these applications the power/data/control levels may be provided via a multi-line bus from a central control point, such as a computer or computer-based controller. Good engineering practice dictates that each load needs to be protected from short/overload fault conditions.

Conventional protection methods include metal-link fuses, circuit breakers, and polymeric positive temperature coefficient ("PPTC") resistor devices, for example. When an overcurrent condition occurs, fuse links rupture irreversibly, breakers trip and must be manually reset, and PPTC devices switch or trip from a few ohms low resistance to a high impedance state in excess of a Mohm high resistance. Switching occurs as a result of local heating of the PPTC device. Unique to PPTC devices, when the overcurrent condition is corrected and the power to the circuit is removed, the PPTC device cools and automatically resets itself to its low resistance state. This automatic reset function provides a significant advantage over metal-link fuses, which must be manually removed and replaced at a fuse block, or breakers that must be manually reset, by a technician or other user of the apparatus, device or appliance being protected.

It is known to form an array of thin film or thick film resistors upon a nonconductive ceramic substrate and package the array in a standard configuration such as dual inline package (DIP) or single inline package (SIP). While such devices are widely used to terminate computer buses with fixed impedance loads, they are entirely passive and do not provide overcurrent protection in a manner equivalent to metal-link fuses, breakers or PPTC devices.

It is also known to provide a single integrated circuit device integrally including load termination resistors and series switches formed of field effect transistor (FET) devices. The active FET devices enable the resistor loads to be collectively disconnected in response to a control signal. Examples of such devices are found in U.S. Pat. No. 5,381,034 issued on Jan. 10, 1995 to Thrower et al., entitled "SCSI Terminator", and U.S. Pat. No. 5,382,841 issued on Jan. 17, 1995 to Feldbaumer, entitled "Switchable Active Bus Termination Circuit", the disclosures thereof being incorporated herein by reference thereto. In these patents, resistors are formed and trimmed as part of an integrated circuit fabrication process, but the resistors, while providing desired bus load impedances, do not provide self-resetting protection fuses in the manner provided by PPTC devices.

It is further known to couple a positive temperature coefficient ("PTC") or negative temperature coefficient ("NTC") resistor thermally to an active device, such as a transistor, silicon controlled rectifier ("SCR"), thyristor, FET, etc., in order to control or protect the active device as a function of temperature of the PTC or NTC resistor. Several examples of power line protection devices and methods are described, for example, in the inventor's commonly assigned, prior U.S. Pat. No. 6,072,681 issued on Jun. 6, 2000 to Cogan et al. and entitled: "Power Line Protection Devices and Methods", the disclosure thereof being incorporated herein in its entirety. Therein, a PPTC device is thermally coupled to an active element configured as a current switch via a common electrically insulative, thermally conductive substrate. If an overcurrent condition occurred at a load, the PPTC device trips, causing the current switch to open and disconnect power from the line/load. Computer monitoring and reset of the protection circuit is provided in some of the disclosed circuit configurations. Other examples of a PPTC device being thermally coupled to control an active device or circuit are given in commonly assigned U.S. Pat. No. 6,331,763 issued on Dec. 18, 2001 to Thomas et al. (including the present inventor), and entitled: "Devices and Methods for Protection of Rechargeable Elements", the disclosure thereof being incorporated herein by reference.

In particular the '763 patent illustrates in FIGS. 45–47 a three-terminal device that includes FET regulator formed upon and thermally coupled to a PPTC substrate element. In these prior approaches, each circuit employed a single PPTC device in conjunction with an active element, and while that approach works well for certain applications, it has a drawback of high cost in circumstances where it is practical or necessary to control multiple lines simultaneously and with a single switch.

However, for some applications and environments, particularly harsh electrical environments such as motor vehicles, a hitherto unsolved need has remained to provide individual overcurrent protection to plural load lines and also to be able to disconnect all of the loads simultaneously in response to a single control signal. While separate circuits, such as fuses and switches or relays, may be connected in series to carry out these separate functions, a hitherto unsolved need has arisen for simultaneously providing these separate functions in a single device providing the advantages of multiple PPTC devices and characteristics.

BRIEF SUMMARY OF THE INVENTION

A general object of the present invention is to provide an electrical device providing overcurrent protection to several low or medium power loads while providing simultaneous control of the loads as well as high voltage isolation between the power control element and the loads in a manner overcoming limitations and drawbacks of the prior art.

Another object of the present invention is to provide a method for protecting plural power loads by a single device which combines individual protection to each load and which may be actuated to disconnect simultaneously all of the loads in response to a control or a sensed condition.

An electrical device in accordance with principles and aspects of the present invention includes a package having an array of connections. A thermally conductive, electrically insulative substrate is provided in the package. Plural resistive elements are provided in the package. Each resistive element has a predetermined non-zero temperature coefficient, is connected to a different pair of connections of the array, and is in thermal contact with the substrate. At least one heating element is provided in the package and is in thermal contact with the substrate. While a variety of solid state passive and active heating elements may be successfully employed, one particularly preferred heating element enabling thermal autoregulation is a semiconductor device with a control electrode, such as a power field effect transistor (FET). The heating element has electrodes connected to associated ones of the array of connections and responds to a control current by heating the substrate and thereby indirectly heating the resistive elements, thereby to change resistance of the plurality of resistive elements. In one preferred aspect of the invention, the plurality of resistive elements comprises polymeric positive temperature coefficient (PPTC) resistors. In another preferred aspect of the present invention, the heating element comprises a semiconductor device having at least one junction, such as a power diode, a power field effect transistor, a power bipolar transistor, a power thyristor, or a power silicon controlled rectifier. In an alternative preferred aspect of the present invention, the substrate is provided by an integral electrode of the semiconductor device, and the device further includes an electrical insulator layer between the resistive elements and the substrate. In another alternative preferred aspect of the present invention, the substrate comprises a lead frame.

In one preferred arrangement of the present invention, an electrical device includes a package having an array of connections, a thermally conductive, electrically insulative substrate in the package, a plurality of polymeric positive temperature coefficient (PPTC) resistors in the package in thermal contact with the substrate wherein each PPTC resistor has a predetermined positive temperature coefficient and is connected to a different pair of connections of the array, and, at least one power field effect transistor in the package in thermal contact with the substrate, and having gate, source and drain electrodes connected to associated ones of the array of connections, for heating the substrate and for indirectly heating the PPTC resistors in response to a control current, thereby to trip the PPTC resistors from a low resistance state to a very high resistance state.

A method for providing separate electrical overload protection to a plurality of electrical loads and providing simultaneous disconnection of the loads in response to a disconnect control signal in accordance with principles of the present invention comprises the following steps:

providing a common heating substrate, mounting or forming a plurality of polymeric positive temperature coefficient (PPTC) resistors to be in thermal contact with the common heating substrate, connecting each PPTC resistor in series with one load of the plurality of electrical loads so that the PPTC resistor will trip to a high resistance state in response to an electrical overload at the one load, providing a heating element such as a power FET in thermal contact with the common heating substrate, and applying the disconnect control signal to a control electrode of the power FET to heat the common heating substrate and thereby trip the plurality of PPTC resistors and simultaneously disconnect the electrical loads.

These and other objects, advantages, aspects and features of the present invention will be more fully understood and appreciated upon consideration of the detailed description of preferred embodiments presented in conjunction with the following drawings.

BRIEF DESCRIPTION OF THE DRAWINGS

FIG. 7 is a schematic circuit diagram of circuits including a device in accordance with principles of the present invention.

FIG. 8 is another schematic circuit diagram of circuits including a device in accordance with principles of the present invention and an additional active element, which turns off as substrate temperature of the FIG. 1 circuit increases.

FIG. 9 is yet another schematic circuit diagram of circuits including a device in accordance with principles of the present invention and a plurality of additional active elements in which an output active element turns on as substrate temperature of the FIG. 1 circuit increases.

DETAILED DESCRIPTION OF THE INVENTION

Figure 1:
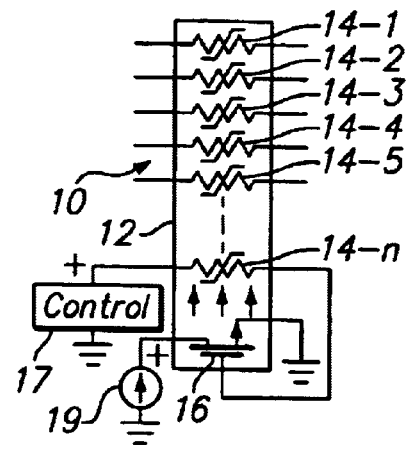
FIG. 1 is an electric circuit schematic diagram of a multiple load protection and control device in accordance with principles of the present invention.

With reference to FIG. 1, a unitary device 10 includes a thermally conductive substrate 12, an array of PPTC resistor elements 14 formed upon the substrate 12 or otherwise attached thereto in a positive thermal conducting arrangement, and a FET power transistor 16 also formed upon, or forming, the substrate 12. While six PPTC elements 14-1, 14-2, 14-3, 14-4, 14-5 and 14-n are shown in FIG. 1, it will be understood by those skilled in the art that the array of PPTC elements 14 may comprise two or more such elements, depending upon the need of a particular application. Each PPTC element 14 may be connected between a source and a load and thereby provide overcurrent protection to the resultant circuit. Additionally, a control signal may be applied by an external control circuit 17 to the power FET 16. When sufficient power is applied to the power FET 16 from an external current source 19, resultant heat is conducted via the substrate 12 to each PPTC element 14 of the array, causing each PPTC resistor element 14 to trip to a very high resistance state. When power is then removed from FET 16 and resultant heat is dissipated, each PPTC element 14 returns to its low resistance state.

One PPTC element, such as resistor 14-n shown in FIG. 1, may be connected in series between a control electrode (gate) of FET 16 and the external control circuit 17, and the resultant circuit arrangement then provides thermal overload protection for the heating substrate 12 along with automatic thermal regulation in order to maintain the PPTC elements 14 of device 10 in a tripped state at a reduced FET power dissipation level, following a very high initial power level provided to trip the PPTC elements 14. When control voltage is removed from the gate of FET 16 (assuming an enhancement-mode FET device is employed as power FET 16), heating ceases. Thereafter, when the PPTC elements 14 cool below a predetermined trip temperature (see e.g. FIG. 6), they return to a low resistance state, and restore a circuit path between each power source and its associated load.

While an insulated gate power MOSFET 16 is shown as a preferred heat-generating active element, other types of heating elements may be employed, including active devices such as a diode, a bipolar transistor, a silicon controlled rectifier, a thyristor, or a power integrated circuit, for example. Passive heating devices, such as wire-wound, composition, or film resistors may also be employed for the heating element.

Figure 2:
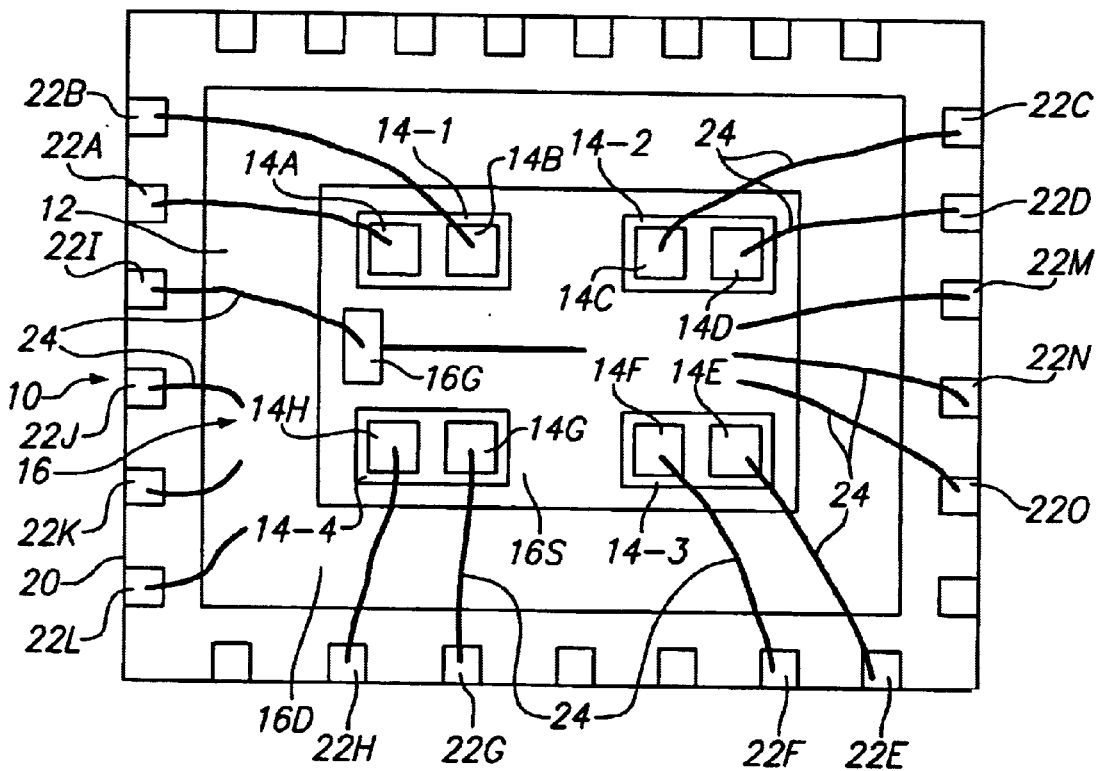
FIG. 2 is a greatly enlarged top plan view of a device embodying principles of the present invention.

FIG. 2 provides a greatly enlarged top plan view of a device 10 in accordance with principles of the present invention. In the FIG. 2 example, the device 10 is housed within a suitable package 20. A power insulated-gate MOSFET 16 includes a silicon chip substrate forming a FET drain electrode 16D, a top planar layer forming a FET source electrode 16S and an insulated gate electrode 16G. Four PPTC devices 14-1, 14-2, 14-3 and 14-4 are mounted directly to the top planar layer 16S in direct thermal contact therewith. The package 20 includes an array of internal bonding pads 22 leading to, or forming, external connection pins or pads.

In the FIG. 2 example electrical interconnect wires 24 extend from the bonding pads 22 to the electrodes of the power MOSFET 16 and to the PPTC elements 14. Pads 14A and 14B of PPTC element 14-1 are respectively connected to bonding pads 22A and 22B. Pads 14C and 14D of element 14-2 are connected respectively to bonding pads 22C and 22D. Pads 14E and 14F of element 14-3 are connected respectively to bonding pads 22E and 22F. And, pads 14G and 14H of element 14-4 are connected respectively to bonding pads 22G and 22H.

The drain electrode of FET 16 is connected to three bonding pads 22J, 22K and 22L; and the source electrode 16S of FET 16 is also connected to three bonding pads 22M, 22N and 22O, in order to carry the electrical current needed to generate an appropriate level of heat. The insulated gate electrode 16G of FET 16 is connected to a bonding pad 22I.

While the PPTC elements 14 of the FIG. 2 device 10 are in direct thermal contact with the source electrode 16S of FET 16, they are preferably electrically insulated therefrom by a suitable thermally conductive dielectric layer, not shown in FIG. 2, in order to provide effective electrical isolation between each PPTC element 14 and the FET 16.

The FIG. 2 device may be encapsulated or hermetically sealed to prevent unwanted exposure of the FET chip 16 with the ambient environment. Suitable external package pins or pads (not shown) connect to, or extend from, respective ones of the internal bonding pads 22 and, and enable the device 10 to be plugged into a socket, or directly soldered onto a circuit board, as may be desired in a particular application.

Figure 3A:
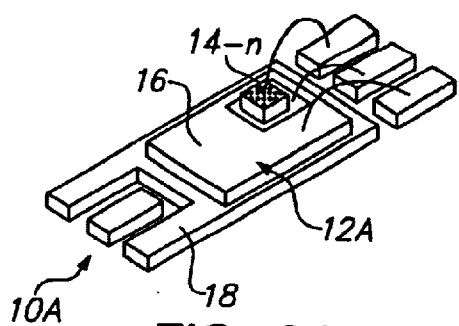
FIG. 3A is an isometric view illustrating a first presently preferred assembly method of a device embodying principles of the present invention.
Figure 3B:
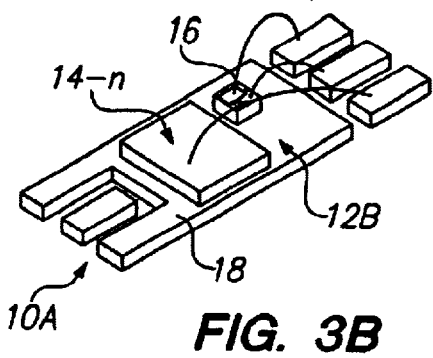
FIG. 3B is an isometric view illustrating a second presently preferred assembly method of a device embodying principles of the present invention.

FIG. 3A illustrates one assembly arrangement of a device 10A in accordance with principles of the present invention. Therein, a FET chip 16 is mounted to a metal lead frame package 18 and PPTC element chips 14-n are mounted onto a substrate 12A formed by the FET chip 16. FIG. 3B illustrates another assembly arrangement of a device 10B in accordance with principles of the present invention. Therein, a lead frame package 18 provides the common thermal substrate 12B. The PPTC elements 14-n and the FET chip 16 are mounted directly to the lead frame package 18.

Figure 4A:
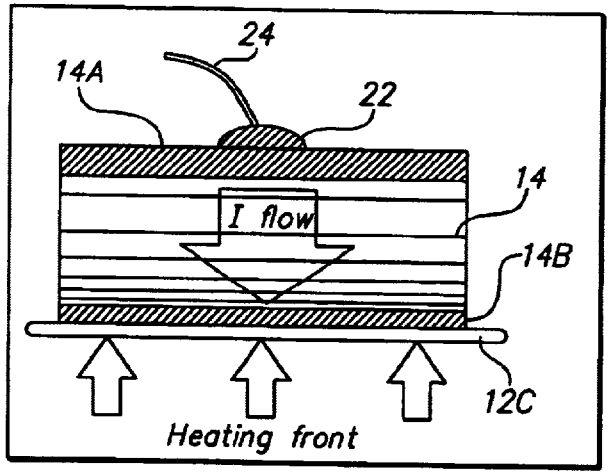
FIG. 4A is an enlarged, diagrammatic side view of a PPTC resistor arranged in a plane-parallel terminal embodiment of the FIG. 1 device and illustrative of internal current flow and heat applied by the heating element.
Figure 4B:
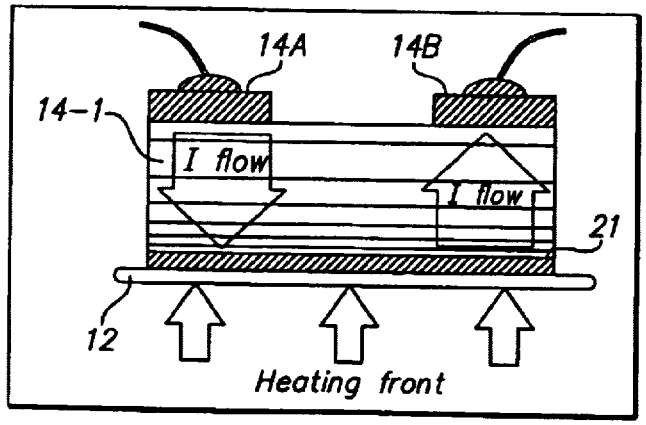
FIG. 4B is an enlarged, diagrammatic side view of a PPTC resistor arranged in a side-by-side terminal embodiment as exemplified by the FIG. 2 device and illustrative of internal current flow and heat applied by the heating element.
Figure 4C:
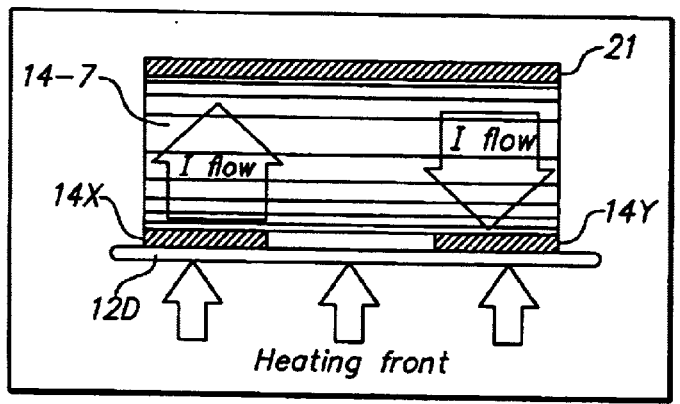
FIG. 4C is an enlarged, diagrammatic side view of a PPTC resistor arranged in a flip-chip terminal embodiment of the FIG. 1 device and illustrative of internal current flow and heat applied by the heating element.

FIGS. 4A, 4B and 4C illustrate several mounting and connection alternatives for the PPTC elements 14. In FIG. 4A, a PPTC element 14 has two planar electrodes in parallel. One electrode 14A is connected to a bonding pad 22, and the other electrode 14B is connected directly to the electrically conductive substrate 12C. In this arrangement all of the PPTC elements 14 are commonly connected to a common circuit node, for example provided by the substrate 12C. In the FIG. 4A example, current flow is shown to be unidirectional, from the electrode 14A to the electrode 14B (or vice versa, with a polarity reversal).

FIG. 4B shows a PPTC element 14-1 having spaced-apart, coplanar side-by-side terminals 14A and 14B connecting to respective bonding pads, and a conductive layer 21 providing the thermal bond to the substrate 12. A dielectric layer (not shown) may be formed between the PPTC element 14-1 and the substrate 12 to provide desired electrical isolation therebetween. In the FIG. 4B arrangement current flow through the PPTC element 14-1 is bidirectional, from electrode 14A to electrode 21, and from electrode 21 to electrode 14B (or vice versa with a polarity reversal).

FIG. 4C shows a PPTC element 14-7 arranged in an inverted or "flip-chip" configuration, such that its terminal electrodes 14X and 14Y are bonded directly to conductive traces formed on an electrically patterned substrate 12D. Current flow is bidirectional, as in the FIG. 4B example.

Figure 5:
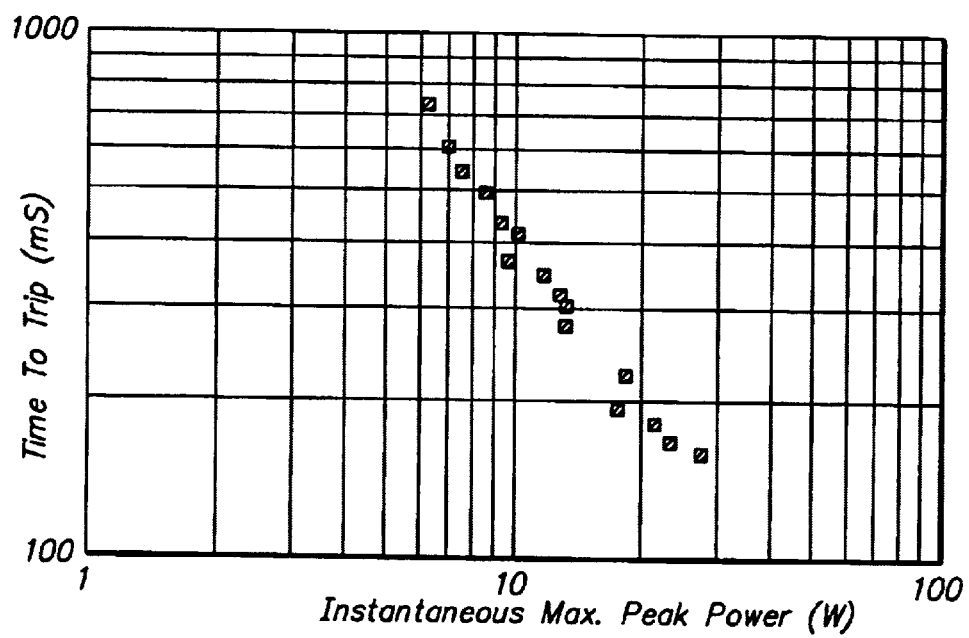
FIG. 5 is a graph plotting time to trip of a PPTC resistor element against FET heater power in a device in accordance with principles of the present invention.

FIG. 5 presents a graph illustrating the time in milliseconds required to cause a PPTC element 14 to trip (switch to a very high resistance state) in response to instantaneous heating generated by the FET 16 and applied to the substrate 12 and PPTC element 14.

Figure 6:
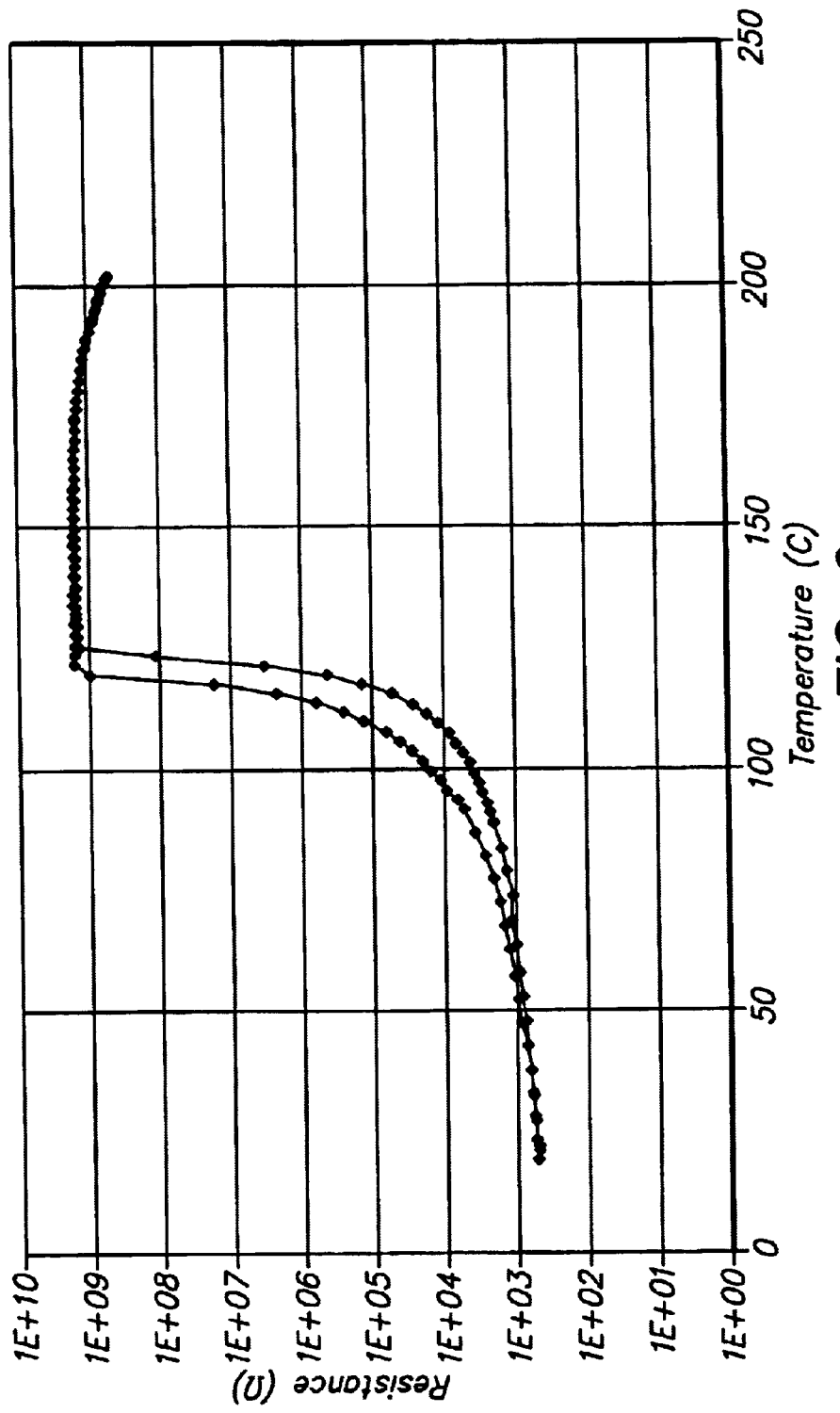
FIG. 6 is graph plotting resistance of a PPTC resistor element of the FIG. 1 device against substrate temperature resulting from FET heating.

FIG. 6 presents a graph of resistance of a PPTC element 14 as a function of temperature. The data presented in the FIG. 6 graph were taken with a PPTC resistor mounted directly to a 10A generic power MOSFET mounted in an SO8 conventional package.

FIG. 7 shows a circuit application of the device 10 wherein an external resistor 30 connects to a voltage supply, silicon controlled rectifier and an external load resistor 32 connects to a ground return of the power supply. Resistors 30 and 32 are in series with a first PPTC resistor element 14-1 of the device 10. Resistors 30, 14-1 and 32 form a voltage divider network. While the load is shown as a resistor 32, those skilled in the art will appreciate that any suitable load may be used, such as a motor, solenoid, incandescent or solid state lamp, etc. The output voltage at a node between resistors 14-1 and 32 will decrease as temperature of the substrate 12 increases (causing resistance of PPTC resistor 14-1 to increase). While only a single output resistor is shown in FIG. 7, it should be understood that output resistors or loads are provided to other ones of the PPTC resistors 14 of the device 10 in a particular circuit application/implementation.

FIG. 8 shows a circuit including device 10 similar to the circuit of FIG. 7 with the addition of an output FET device 36 and a suitable drain resistor 34 leading to a power supply. An output level at the drain electrode of the FET device 36 will fall as temperature of substrate 12 of the device 10 increases. The output active device 36 can be replaced by an electromagnetic relay, incandescent lamp, light emitting diode indicator, laser diode, comparator, meter, or any other suitable level-sensing or level-indicating device.

In the FIG. 9 circuit, an additional active device, such as FET 40 having drain resistor 38, is interposed between the load resistor 32 and the output FET 36. In this circuit arrangement, the output level at the drain electrode of the output FET device 36 will rise as temperature of substrate 12 of the device 10 increases. The output level thereby provides a positive indication of the "tripped" status of the associated PPTC device 14.

These circuit arrangements may be used for connecting and/or disconnecting electrical loads while maintaining electrical isolation (separation) between the driving circuit and the load. These arrangements provide effective methods for power control as well as for circuit protection. Further, the heating substrate 12 may also serve as a protected element, as illustrated for example by the FIG. 1 circuit.

Having thus described preferred embodiments of the invention, it will now be appreciated that the objects of the invention have been fully achieved, and it will be understood by those skilled in the art that many changes in construction and widely differing embodiments and applications of the invention will suggest themselves without departing from the spirit and scope of the invention. Therefore, the disclosures and descriptions herein are purely illustrative and are not intended to be in any sense limiting.

What is claimed is:

1. An electrical device comprising:

a package having an array of connections, a thermally conductive, electrically insulative substrate in the package, a plurality of resistive elements in the package and in thermal contact with the substrate, each resistive element having a predetermined non-zero temperature coefficient and connected to a different pair of connections of the array, and at least one heating element in the package and in thermal contact with the substrate, and having electrodes connected to associated ones of the array of connections, for heating the substrate and for indirectly heating the resistive elements in response to an externally applied control current, thereby to change resistance of the plurality of resistive elements.

2. The electrical device set forth in claim 1 wherein the plurality of resistive elements comprises polymeric positive temperature coefficient (PPTC) resistors.

3. The electrical device set forth in claim 1 wherein said at least one heating element comprises a semiconductor device having at least one junction.

4. The electrical device set forth in claim 3 wherein the semiconductor device comprises one of a power diode, a power field effect transistor, a power bipolar transistor, a power thyristor, and a power silicon controlled rectifier.

5. The electrical device set forth in claim 3 wherein the substrate comprises an integral electrode of the semiconductor device.

6. The electrical device set forth in claim 5 further comprising an electrical insulator layer between the resistive elements and the substrate.

7. The electrical device set forth in claim 1 wherein the substrate comprises a patterned array of electrical traces, and wherein each resistive element includes two in-plane, spaced apart, connection pads, said pads being bonded directly to respective ones of said electrical traces of the substrate.

8. The electrical device set forth in claim 1 wherein the substrate comprises a lead frame.

9. An electrical device comprising:

a package having an array of connections, a thermally conductive, electrically insulative substrate in the package, a plurality of polymeric positive temperature coefficient (PPTC) resistors in the package in thermal contact with the substrate, each PPTC resistor having a predetermined positive temperature coefficient and being connected to a different pair of connections of the array, and at least one power field effect transistor in the package in thermal contact with the substrate, and having gate, source and drain electrodes connected to associated ones of the array of connections, for heating the substrate and for indirectly heating the PPTC resistors in response to a control current, thereby to trip the PPTC resistors from a low resistance state to a very high resistance state.

10. The electrical device set forth in claim 9 comprising an electrical circuit arrangement in which one of the plurality of PPTC resistors is connected in series between the gate electrode of the field effect transistor and an external control signal source.

11. A method for providing separate electrical overload protection to a plurality of electrical loads and providing simultaneous disconnection of the loads in response to a disconnect control signal, comprising the steps of:

providing a common heating substrate, providing a plurality of polymeric positive temperature coefficient (PPTC) resistors in thermal contact with the common heating substrate and connecting each PPTC resistor in series with one load of the plurality of electrical loads so that the PPTC resistor will trip to a high resistance state in response to an electrical overload at the one load, providing a heating element in thermal contact with the common heating substrate, and applying the disconnect control signal to the heating element to heat the common heating substrate and thereby trip the plurality of PPTC resistors and simultaneously disconnect the electrical loads.

12. The method set forth in claim 11 wherein the step of providing a heating element comprises providing a semiconductor power switching device having a control electrode, and wherein the step of applying the disconnect control signal to the heating element comprises the step of applying the disconnect control signal to the control electrode.

13. The method set forth in claim 12 wherein the step of providing the semiconductor power switching device comprises the step of providing a field effect transistor having a gate electrode, and wherein the step of applying the disconnect control signal to the control electrode comprises applying the disconnect control signal to the gate electrode.

* * * * *